United States Patent
Maeng et al.

(10) Patent No.: US 10,401,995 B2
(45) Date of Patent: *Sep. 3, 2019

(54) TOUCH SENSOR PANEL AND METHOD FOR FABRICATING THE SAME

(71) Applicant: DONGWOO FINE-CHEM CO., LTD., Iksan-si, Jeollabuk-do (KR)

(72) Inventors: Changjun Maeng, Hwaseong-si (KR); Jong Hee Kim, Gunpo-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,646

(22) Filed: Dec. 26, 2018

(65) Prior Publication Data

US 2019/0129528 A1    May 2, 2019

Related U.S. Application Data

(63) Continuation of application No. 15/512,262, filed as application No. PCT/KR2015/009650 on Sep. 15, 2015.

(30) Foreign Application Priority Data

Sep. 19, 2014  (KR) .................. 10-2014-0125016

(51) Int. Cl.
*G06F 3/041*    (2006.01)

(52) U.S. Cl.
CPC .... *G06F 3/041* (2013.01); *G06F 2203/04103* (2013.01); *G06F 2203/04112* (2013.01)

(58) Field of Classification Search
CPC .......... G06F 3/041; G06F 2203/04112; G06F 2203/04103
See application file for complete search history.

(56) References Cited

U.S. PATENT DOCUMENTS

| | | | |
|---|---|---|---|
| 2011/0291966 A1 | 12/2011 | Takao et al. | |
| 2012/0081324 A1 | 4/2012 | Philipp | |
| 2013/0135222 A1 | 5/2013 | Kim et al. | |
| 2014/0055403 A1 | 2/2014 | Cok | |
| 2016/0018929 A1 | 1/2016 | Kida et al. | |

FOREIGN PATENT DOCUMENTS

| | | |
|---|---|---|
| KR | 10-1111564 B1 | 2/2012 |
| KR | 10-2014-0010980 A | 1/2014 |
| KR | 10-2014-0025922 A | 3/2014 |

OTHER PUBLICATIONS

International Searching Authority, International Search Report of PCT/KR2015/009650, dated Jan. 15, 2016. [PCT/ISA/210].

*Primary Examiner* — Muhammad N Edun
(74) *Attorney, Agent, or Firm* — Sughrue Mion, PLLC

(57) ABSTRACT

The present invention provides a touch sensor panel and a fabrication method thereof, in which metal wires for forming a metal mesh are subject to patterning to have symmetrical components being in correlation with each other on the basis of x and y axes, thereby improving visibility. In the touch sensor panel and the fabrication method thereof, the metal wires consist of continuous unit wires in which a unit wire and another unit wire crossing with the unit wire have symmetrical components being in correlation with each other and the size of the symmetrical components is determined based on the line width of the unit wires.

4 Claims, 11 Drawing Sheets

[Figure 1]
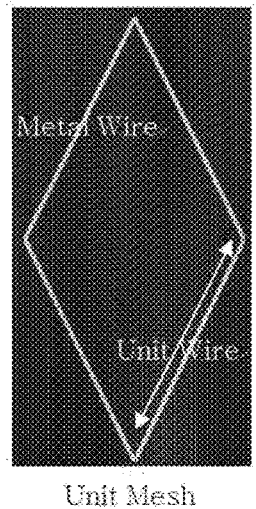
Unit Mesh
[Figure 2]
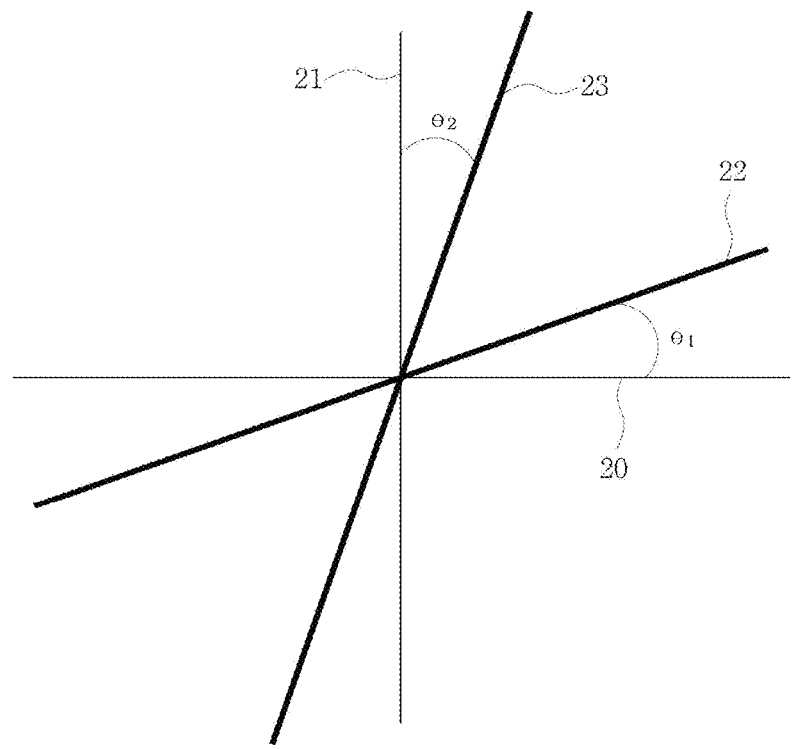

[Figure 3a]
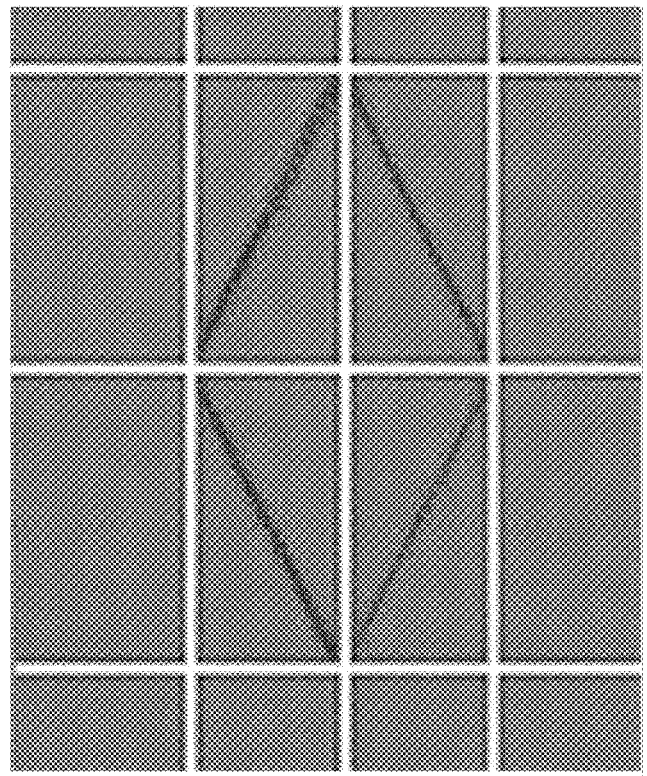
[Figure 3b]
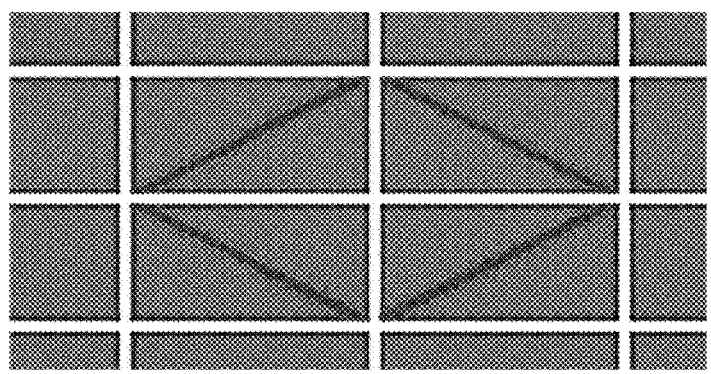

[Figure 3c]
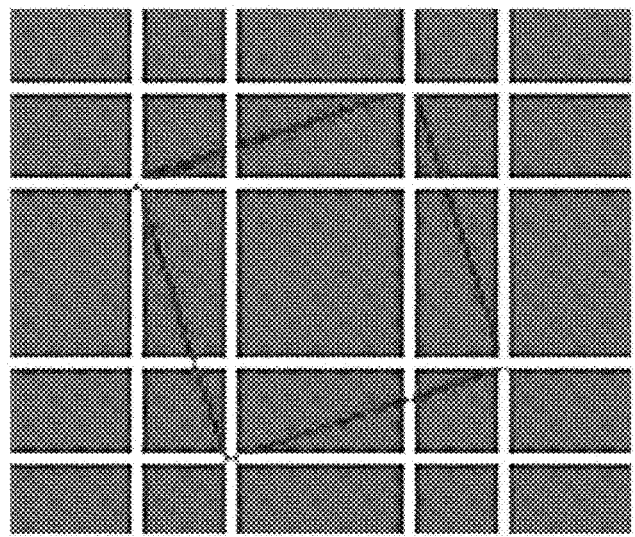
[Figure 3d]
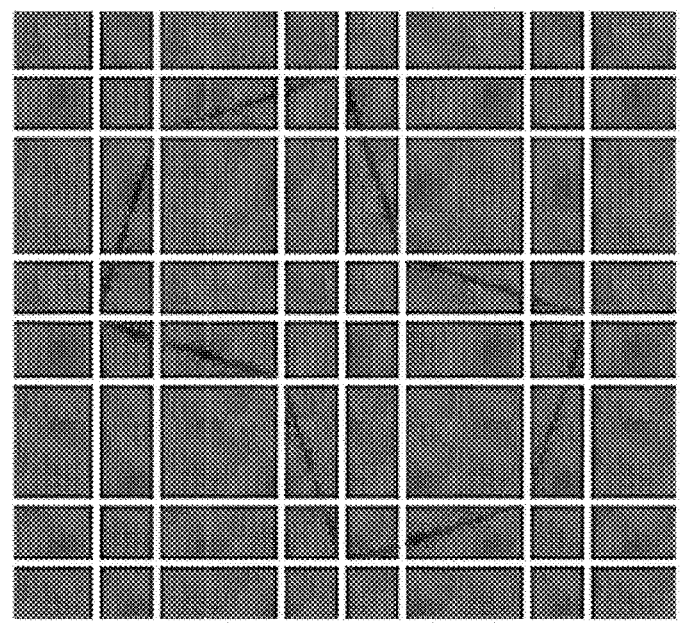

[Figure 3e]
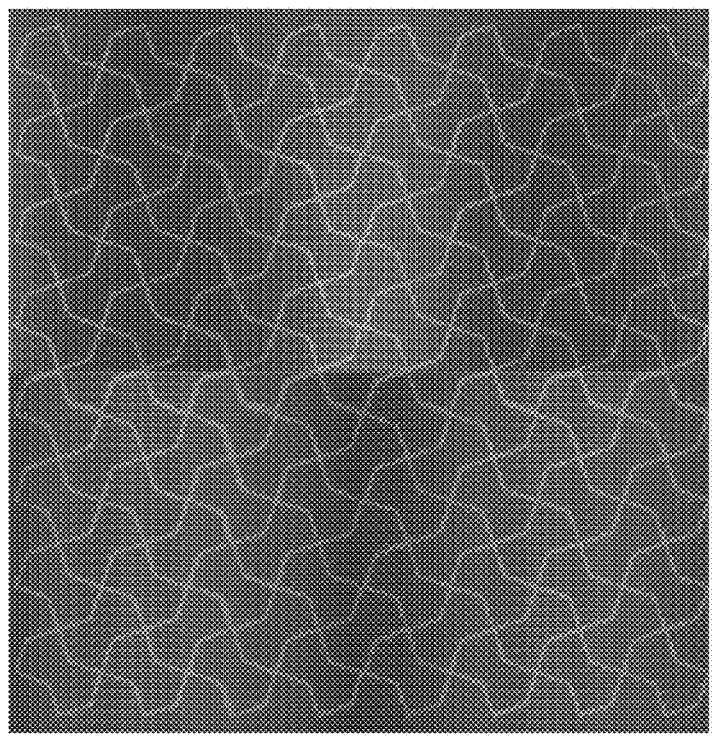

[Figure 4a]
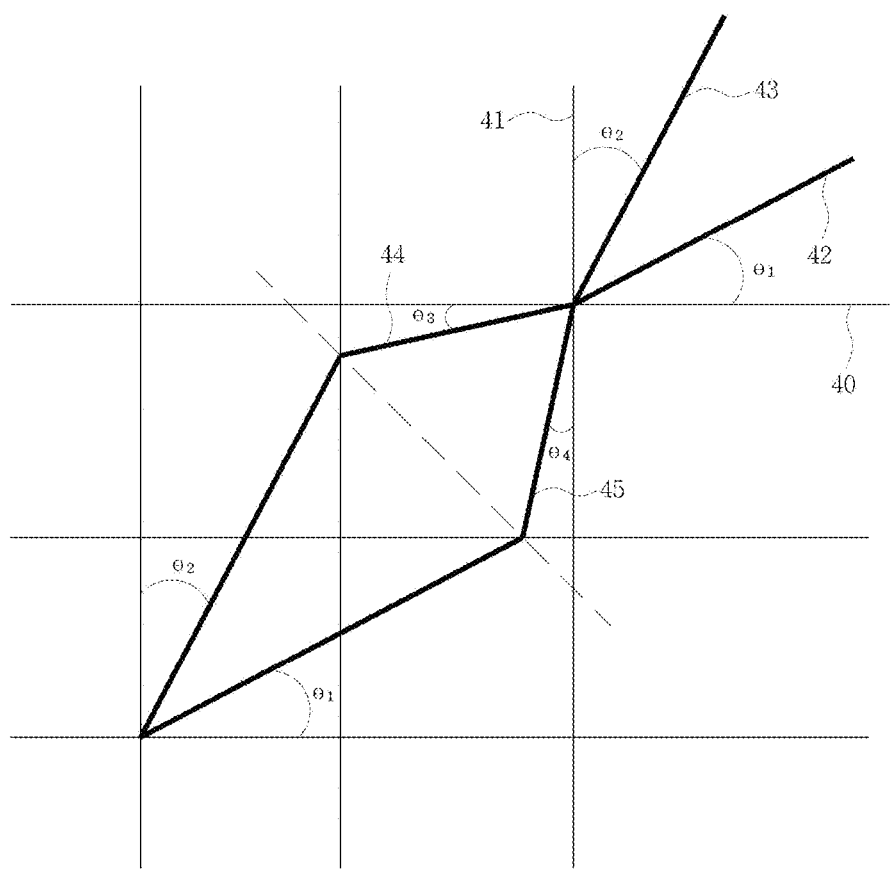

[Figure 4b]
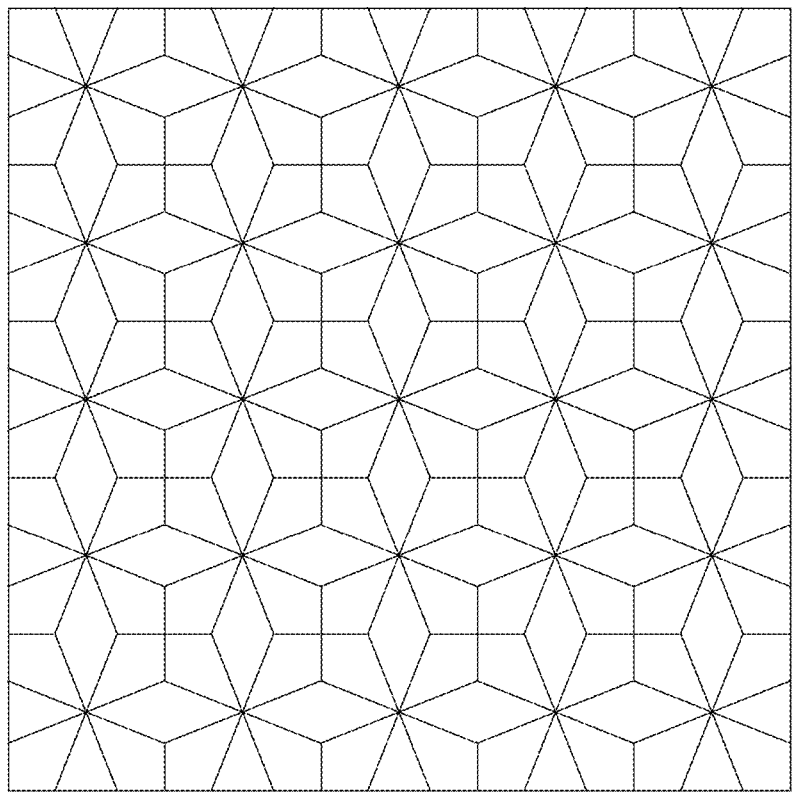
[Figure 5a]
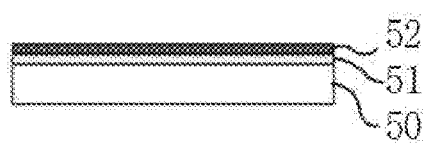
[Figure 5b]

[Figure 5c]
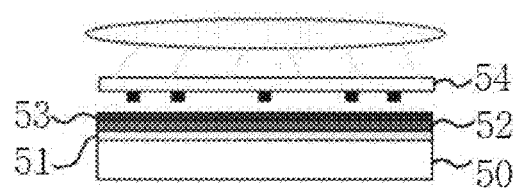
[Figure 5d]
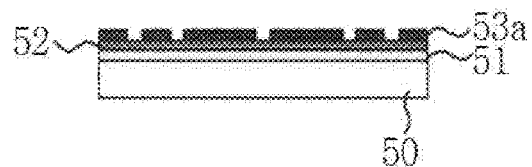
[Figure 5e]
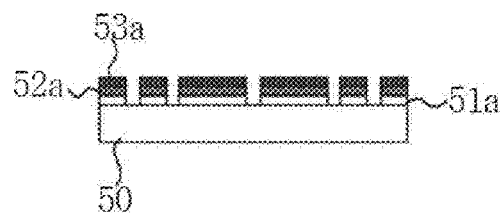
[Figure 5f]
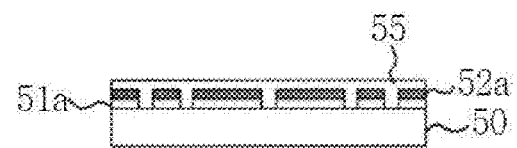

[Figure 5g]
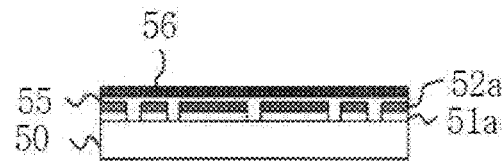
[Figure 5h]
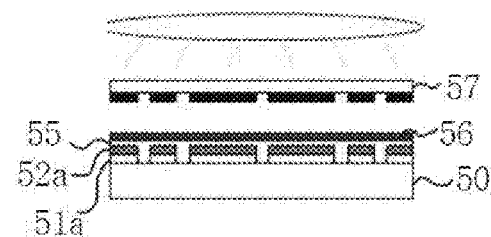
[Figure 5i]
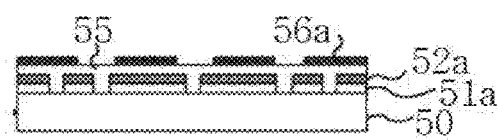
[Figure 5j]
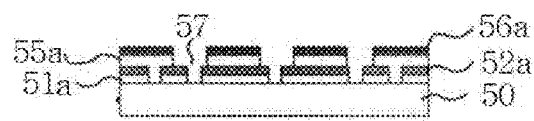
[Figure 5k]
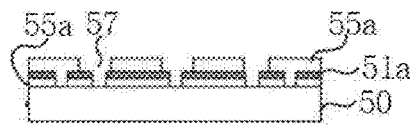

[Figure 5l]
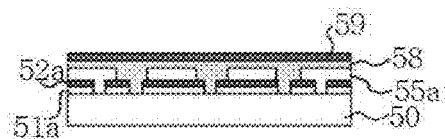
[Figure 5m]
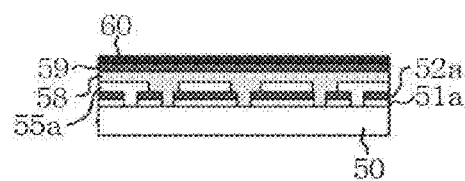
[Figure 5n]
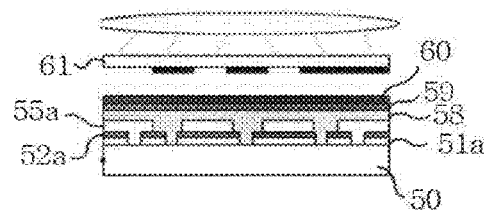
[Figure 5o]
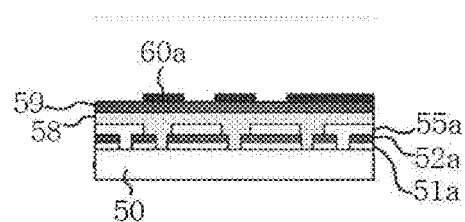

[Figure 5p]
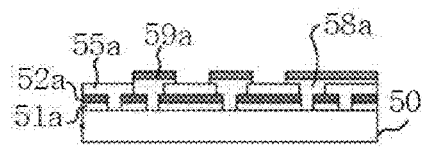
[Figure 5q]
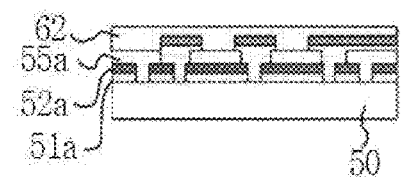
[Figure 5r]
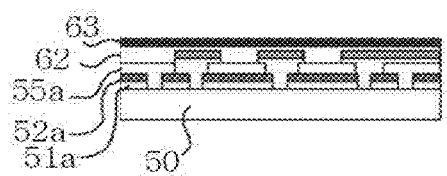
[Figure 5s]
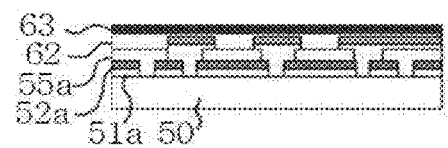

【Figure 5t】
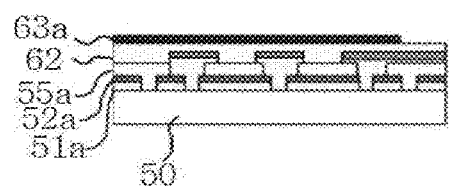
【Figure 5u】
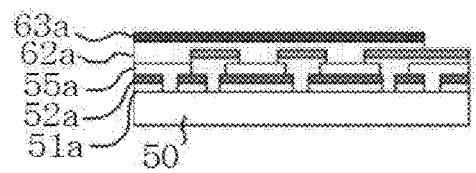
【Figure 5v】
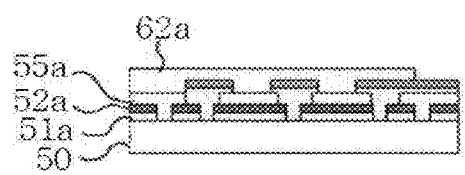

TOUCH SENSOR PANEL AND METHOD FOR FABRICATING THE SAME

CROSS REFERENCE TO RELATED APPLICATIONS

This application is a Continuation Application of U.S. application Ser. No. 15/512,262, filed Mar. 17, 2017, which is a National Stage of International Application No. PCT/KR2015/009650 filed Sep. 15, 2015, claiming priority based on Korean Patent Application No. 10-2014-0125016, filed Sep. 19, 2014, the contents of all of which are incorporated herein by reference in their entirety.

TECHNICAL FIELD

The present invention relates to a touch panel, and more particularly, to a touch sensor panel and a fabrication method thereof, in which metal wires for forming a metal mesh are subject to patterning to have symmetrical components being in correlation with each other on the basis of x and y axes, thereby improving visibility.

BACKGROUND ART

A touch panel, which is an input/output means for detecting a touch position of a user on a display screen and receiving information on the detected touch position to perform an overall control of an electronic device including a display screen control, is a device which recognizes touch as an input signal when an object such as a finger or a touch pen is touched on the screen.

The touch input device has been frequently mounted on a mobile device such as a mobile phone, a personal digital assistant (PDA), and a portable multimedia player (PMP) in recent years. In addition, the touch input device is used throughout overall industries, such as a navigation, a netbook, a notebook, a digital information device (DID), a desktop computer using an operating system that supports touch input, an internet protocol TV (IPTV), a state-of-the-art fighter, a tank, and an armored vehicle.

The touch panel is designed to be added on or embedded in a display device such as a liquid crystal display (LCD), a plasma display panel (PDP), an organic light emitting diode (OLED), or an active matrix organic light emitting diode (AMOLED).

The touch panel is optically transmissive and includes detecting units employing a conductive material.

The detecting units are formed in repetitive patterns in order to recognize the position of an input signal on the touch sensor panel. In this case, there is a problem that as detecting layers including the detecting units are laminated in parallel, the patterns overlap each other and therefore a moire phenomenon occurs due to interference between the patterns.

There are proposed methods in which, when patterns constituting detecting electrodes overlap each other due to the stack of detecting substrates or the stack of the detecting substrate and an image display panel, torsion based on a predetermined angle is applied between the patterns to prevent the occurrence of a moire pattern, thereby solving a problem that visibility is deteriorated due to the moire pattern.

As another method for improving visibility deterioration due to diffraction, refraction, diffused reflection, moiré pattern and the like by the mesh patterns constituting detecting electrodes, Korean Patent No. 10-1111564 discloses a sensor for a capacitive touch panel, including honeycomb mesh patterns and a capacitive touch panel, in which mesh patterns comprising honeycomb patterns and diamond patterns are used to improve visibility.

However, such a mesh pattern structure formed by continuously repeated honeycomb patterns and diamond patterns may have a reduced transmittance due to the overlap of the patterns, and it has a difficulty in mass production.

DISCLOSURE OF INVENTION

Technical Problem

The present invention is to solve the problems of the mesh pattern structure in the prior touch panel, and therefore, an object of the present invention is to provide a touch sensor panel and a fabrication method thereof, in which metal wires for forming a metal mesh are subject to patterning to have symmetrical components being in correlation with each other on the basis of x and y axes, thereby improving visibility.

Another object of the present invention is to provide a touch sensor panel and a fabrication method thereof, in which metal wires for forming a metal mesh are subject to patterning to have a combination of several symmetrical components being in correlation with each other on the basis of x and y axes, thereby improving visibility.

Still another object of the present invention is to provide a touch sensor panel and a fabrication method thereof, in which tetragonal to polygonal patterns are freely formed by patterning that implements a combination of several symmetrical components, thereby improving visibility without limitation to pattern forms.

Still another object of the present invention is to provide a touch sensor panel and a fabrication method thereof, in which metal wires have different angles formed by one of them and the x or y axis, based on their line width greater or less than the reference line width value, thereby forming a metal mesh having an optimum angle capable of preventing the occurrence of a moire pattern.

The objects of the present invention are not limited to the aforementioned objects, and other objects thereof will be understandable by those skilled in the art from the following descriptions.

Technical Solution

According to an aspect of the present invention, there is provided a touch sensor panel having electrode patterns in which continuous unit meshes consisting of conductive unit wires are arranged, wherein two unit wires connected to a vertex of the unit mesh form an angle satisfying the following equation with the x-axis or the y-axis:

$$|\Theta_1|=|\Theta_2|$$

wherein, $\Theta_1$ is an angle formed by any one of two unit wires and the x-axis, and $\Theta_2$ is an angle formed by the other unit wire and the x-axis or the y-axis.

The above equation is applied for all vertices constituting the unit mesh.

The angle ($\Theta$, $\Theta=|\Theta_1|=|\Theta_2|$) formed by each of two unit wires and the x-axis or the y-axis may satisfy $18°<\Theta<33°$ or $57°<\Theta<72°$ when the line width of the unit wires is greater than 3 μm.

Also, the angle ($\Theta$, $\Theta=|\Theta_1|=|\Theta_2|$) formed by each of two unit wires and the x-axis or the y-axis may satisfy 12°<$\Theta$<78° when the line width of the unit wires is greater than 1 μm and not greater than 3 μm.

In addition, the angle ($\Theta$, $\Theta=|\Theta_1|=|\Theta_2|$) formed by each of two unit wires and the x-axis or the y-axis may satisfy 0°≤$\Theta$≤90° when the line width of the unit wires is not greater than 1 μm.

The unit mesh may consist of unit wires having the same size.

Also, the unit mesh may consist of two or more symmetrical unit wires having different sizes with each other.

The electrode patterns may comprise a first unit mesh and a second unit mesh having different sizes with each other.

According to another aspect of the present invention, there is provided a method for fabricating a touch sensor panel, comprising: forming a metal layer on a substrate; and bringing the metal layer into patterning to form electrode patterns in which continuous unit meshes consisting of conductive unit wires are arranged, wherein two unit wires connected to a vertex of the unit mesh form an angle satisfying the following equation with the x-axis or the y-axis:

$$|\Theta_1|=|\Theta_2|$$

wherein, $\Theta_1$ is an angle formed by any one of two unit wires and the x-axis, and $\Theta_2$ is an angle formed by the other unit wire and the x-axis or the y-axis.

The above equation is applied for all vertices constituting the unit mesh.

The angle ($\Theta$, $\Theta=|\Theta_1|=|\Theta_2|$) formed by each of two unit wires and the x-axis or the y-axis may satisfy 18°<$\Theta$<33° or 57°<$\Theta$<72° when the line width of the unit wires is greater than 3 μm.

Also, the angle ($\Theta$, $\Theta=|\Theta_1|=|\Theta_2|$) formed by each of two unit wires and the x-axis or the y-axis may satisfy 12°<$\Theta$<78° when the line width of the unit wires is greater than 1 μm and not greater than 3 μm.

In addition, the angle ($\Theta$, $\Theta=|\Theta_1|=|\Theta_2|$) formed by each of two unit wires and the x-axis or the y-axis may satisfy 0°≤$\Theta$≤90° when the line width of the unit wires is not greater than 1 μm.

Advantageous Effects

The touch sensor panel and the fabrication method thereof according to the present invention have effects as follows.

First, metal wires for forming a metal mesh can be patterned so that they have symmetrical components being in correlation with each other on the basis of x and y axes, thereby improving visibility.

Second, metal wires for forming a unit mesh can be patterned so that they have a combination of several symmetrical components being in correlation with each other on the basis of x and y axes, thereby effectively preventing the occurrence of a moire pattern.

Third, the patterning may be carried out so that several symmetrical components are combined to form tetragonal to polygonal patterns freely according to angles, thereby improving visibility without limitation to pattern forms.

Fourth, metal wires can have different angles formed by one of them and the x or y axis, based on their line width greater or less than the reference line width value, thereby forming a metal mesh having an optimum angle capable of preventing the occurrence of a moire pattern.

DESCRIPTION OF DRAWINGS

FIG. 1 is a configuration view showing an example of a unit mesh according to the present invention.

FIG. 2 is a configuration view showing symmetrical components being in correlation with each other on the basis of x and y axes.

FIGS. 3a to 3e are configuration views of the touch sensor panels according to embodiments of the present invention.

FIGS. 4a and 4b show the configuration of a touch sensor panel patterned so that several symmetrical components are combined in a unit mesh.

FIGS. 5a to 5v are sectional views of a process for fabricating the touch sensor panel according to the present invention.

MODE FOR INVENTION

Hereinafter, preferred embodiments of a touch sensor panel and a fabrication method thereof according to the present invention will be described as follows.

Features and advantages of the touch sensor panel and the fabrication method thereof according to the present invention will be apparent through the following detailed descriptions of embodiments.

FIG. 1 is a configuration view showing an example of a unit mesh according to the present invention. FIG. 2 is a configuration view showing symmetrical components being in correlation with each other on the basis of x and y axes.

In the present invention, metal wires for forming a metal mesh are subject to patterning to have symmetrical components being in correlation with each other on the basis of x and y axes, thereby improving visibility.

In one embodiment of the present invention, metal wires for forming a metal mesh may be subject to patterning to have a combination of several symmetrical components being in correlation with each other on the basis of x and y axes in a unit mesh.

Also, the patterning may be carried out so that several symmetrical components are combined to form tetragonal to polygonal patterns freely according to angles, and the metal wires may form different angles with the x or y axis, based on their line width greater or less than the reference line width value, thereby forming a metal mesh having an optimum angle capable of preventing the occurrence of a moire pattern.

FIG. 1 is a configuration view of a unit mesh and unit wires according to the present invention. As used herein, the unit mesh refers to a mesh pattern formed by crossing of a metal wire and another metal wire, and the unit wire refers to a metal wire that corresponds to the length of a side constituting the unit mesh.

Also, the metal mesh consists of the connected unit meshes.

FIG. 2 shows symmetrical components being in correlation with each other on the basis of x and y axes. In the touch sensor panel having electrode patterns in which continuous unit meshes consisting of conductive unit wires are arranged, two unit wires connected to a vertex of the unit mesh form an angle satisfying the following equation with the x-axis or the y-axis:

$$|\Theta_1|=|\Theta_2|$$

wherein, $\Theta_1$ is an angle formed by any one of two unit wires and the x-axis, and $\Theta_2$ is an angle formed by the other unit wire and the x-axis or the y-axis.

That is, a first unit wire 22 forms an angle $\Theta_1$ with x-axis 20, and a second unit wire 23 crossing with the first unit wire forms an angle $\Theta_2$ with x-axis 20 or y-axis 21.

The angles $\Theta_1$ and $\Theta_2$ are symmetrical components. Also, the above equation is applied for all vertices constituting the unit mesh.

As the symmetrical components, $\Theta_1$ is a torsional angle of any one of two unit wires from the x-axis, and $\Theta_2$ is a torsional angle of the other unit wire from the x-axis or the y-axis, the angles $\Theta_1$ and $\Theta_2$ have the same size.

Also, the x-axis is the direction of a driving electrode ($T_x$) constituting the touch panel and the y-axis is the direction of a detecting electrode ($R_x$).

The size of the symmetrical components may vary depending on the line width of the unit wire, and it is preferably adopted based on the line width to form a metal mesh.

For example, the angle ($\Theta$, $\Theta = |\Theta_1| = |\Theta_2|$) formed by each of two unit wires and the x-axis or the y-axis may satisfy $18° < \Theta < 33°$ or $57° < \Theta < 72°$ when the line width of the unit wires is greater than 3 μm.

Also, the angle ($\Theta$, $\Theta = |\Theta_1| = |\Theta_2|$) formed by each of two unit wires and the x-axis or the y-axis may satisfy $12° < \Theta < 78°$ when the line width of the unit wires is greater than 1 μm and not greater than 3 μm.

In addition, the angle ($\Theta$, $\Theta = |\Theta_1| = |\Theta_2|$) formed by each of two unit wires and the x-axis or the y-axis may satisfy $0° \leq \Theta \leq 90°$ when the line width of the unit wires is not greater than 1 μm.

When the size of the symmetrical components satisfies such range, the occurrence of a moire pattern can be prevented.

FIGS. 3a to 3d show that the unit mesh consisting of a unit wire and another unit wire crossing with the unit wire has symmetrical components having the same size.

The unit mesh according to the present invention is not limited to the forms shown in FIGS. 3a to 3d and may be modified and embodied in other forms.

FIG. 3e shows the configuration of a metal wire consisting of the unit mesh of FIG. 3d.

Thus, the symmetrical components of the unit mesh may have the same size. Alternatively, several symmetrical components may be combined in the unit mesh through patterning.

FIGS. 4a and 4b show the configuration of a touch sensor panel patterned so that several symmetrical components are combined in a unit mesh.

As shown in FIG. 4a, a unit mesh consisting of a unit wire and another unit wire crossing with the unit wire may be configured to have a combination of first and second symmetrical components having different sizes with each other.

In FIG. 4a that shows symmetrical components being in correlation with each other on the basis of x and y axes, a first unit wire 42 forms an angle $\Theta_1$ with x-axis 40, a second unit wire 43 crossing with the first unit wire forms an angle $\Theta_2$ with x-axis 40 or y-axis 41, a third unit wire 44 connected to the first unit wire 42 forms an angle $\Theta_3$ with x-axis 40, and a fourth unit wire 45 connected to the second wire 43 forms an angle $\Theta_4$ with x-axis 40 or y-axis 41.

The angles $\Theta_1$ and $\Theta_2$ have the same size and the angles $\Theta_3$ and $\Theta_4$ have the same size, but the first symmetrical components ($\Theta_1$, $\Theta_2$) have a size different from the second symmetrical components ($\Theta_3$, $\Theta_4$).

Thus, the first symmetrical regions having angles $\Theta_1$ and $\Theta_2$ with the x and y axes and the second symmetrical regions having angles $\Theta_3$ and $\Theta_4$ with the x and y axes are combined to form a unit mesh.

FIG. 4b shows the configuration of a metal wire formed by combination of a structure of the unit mesh in which symmetrical components have the same size as shown in FIG. 3a and a structure of the unit mesh in which the first symmetrical regions having angles $\Theta_1$ and $\Theta_2$ with the x and y axes are combined with the second symmetrical regions having angles $\Theta_3$ and $\Theta_4$ with the x and y axes as shown in FIG. 4a.

That is, the metal wire is formed by combination of a first unit mesh consisting of symmetrical components having the same size and a second unit mesh consisting of a first symmetrical component and a second symmetrical component having different sizes.

Such metal mesh-forming metal wires are subject to patterning to have symmetrical components $\Theta_1$, $\Theta_2$ being in correlation with each other on the basis of x and y axes, thereby fabricating a touch sensor panel having improved visibility, as described below.

FIGS. 5a to 5v are sectional views of a process for fabricating the touch sensor panel according to the present invention.

The fabricating process in the following description shows an example of a process to which the unit mesh according to the present invention is applied. The process of the present invention is not limited to the structures and process conditions described below, and various modifications may be adopted.

First, as shown in FIG. 5a, a first oxide layer 51 and a first metal layer 52 are formed on a transparent substrate 50.

The first oxide layer 51 may include indium tin oxide (ITO) and indium zinc oxide (IZO). The first metal layer 52 may include a Mo and Ag alloy, an Al alloy, and the like.

Thereafter, a photoresist 53 is applied on the first metal layer 52 as shown in FIG. 5b, and then exposed using a photomask 54 in which a mesh pattern is formed as shown in FIG. 5c.

Subsequently, as shown in FIG. 5d, a photoresist pattern layer 53a is formed by developing the photoresist 53. As shown in FIG. 5e, the first metal layer 52 and the first oxide layer 51 are selectively patterned with a wet etching liquid by using the photoresist pattern layer 53a, thereby forming a first oxide layer pattern 51a and a first metal pattern 52a.

Here, the first metal pattern 52a becomes a metal wire in any one direction, which constitutes the detecting unit. Metal wires consisting of continuous unit wires may be patterned so that a unit wire and another unit wire crossing with the unit wire have symmetrical components being in correlation with each other, as shown in FIGS. 2 and 4a.

In the touch sensor panel having electrode patterns in which continuous unit meshes consisting of conductive unit wires are arranged, the symmetrical components obtained in the patterning for forming the first metal pattern 52a means that two unit wires connected to a vertex of the unit mesh form an angle satisfying the following equation with the x-axis or the y-axis:

$$|\Theta_1| = |\Theta_2|$$

wherein, $\Theta_1$ is an angle formed by any one of two unit wires and the x-axis, and $\Theta_2$ is an angle formed by the other unit wire and the x-axis or the y-axis.

Also, in the patterning for forming the first metal pattern 52a, two unit wires are patterned so that the angle ($\Theta$, $\Theta=|\Theta_1|=|\Theta_2|$) formed by each of two unit wires and the x-axis or the y-axis satisfies 18°<$\Theta$<33° or 57°<$\Theta$<72° when the line width of the unit wires is greater than 3 μm, the angle satisfies 12°<$\Theta$<78° when the line width of the unit wires is greater than 1 μm and not greater than 3 μm, and the angle satisfies 0°≤$\Theta$≤90° when the line width of the unit wires is not greater than 1 μm.

Thereafter, as shown in FIG. 5f, the photoresist pattern layer 53a is removed and an insulating layer (SiON) 55 is formed on the first metal pattern 52a.

Subsequently, a photoresist (PR) 56 is applied on the insulating layer 55 as shown in FIG. 5g. The photoresist 56 is then exposed using a photomask 57 in which a hole pattern is formed as shown in FIG. 5h, thereby forming a photoresist pattern layer 56a as shown in FIG. 5i.

Thereafter, as shown in FIG. 5j, the insulating layer 55 is selectively removed through a dry etching process using the photoresist pattern layer 56a, thereby forming a connection hole 57. As shown in FIG. 5k, the photoresist pattern layer 56a is removed.

Subsequently, as shown in FIG. 5l, a second oxide layer 58 and a second metal layer 59 are formed on an insulating layer pattern 55a in which the connection hole 57 is formed.

Thereafter, as shown in FIG. 5m, a photoresist 60 is applied on the second metal layer 59. As shown in FIG. 5n, the photoresist 60 is exposed using a photomask 61 in which a mesh bridge pattern is formed.

Subsequently, as shown in FIG. 5o, a photoresist pattern layer 60a is formed by developing the photoresist 60. As shown in FIG. 5p, the second metal layer 59 and the second oxide layer 58 are selectively patterned with a wet etching liquid by using the photoresist pattern layer 60a, thereby forming a second oxide layer pattern 58a and a mesh bridge pattern 59a.

Thereafter, as shown in FIGS. 5q to 5v, an inorganic or organic insulating layer 62 is formed on the mesh bridge pattern 59a, and a photoresist pattern layer 63a and an inorganic or organic insulating layer pattern layer 62a are formed by performing application of a photoresist 63 and exposure and development using a photomask 64, thereby fabricating a substrate on which detecting electrodes and driving electrodes are formed.

The touch sensor panel according to the present invention thus fabricated has moire suppression characteristics as follows.

sion, moiré characteristics on an angle size are compared at 1, 2, 3, 4 and 5 μm, the line width of metal wires.

In the pixel structures, the RGB Stripe form is obtained by arranging three sub-pixels of R, G and B with the same area, the Pentile form is obtained by making the size of the G sub-pixel be decreased, e.g., making the size of sub-pixels into R:G:B=2:1:2, or by making a unit pixel in the form of RGBG, considering that the human eye is sensitive to green color.

Also, the S-Stripe form is obtained by arranging blue organics vertically while arranging green and red organics horizontally, and the Diamond form is obtained by adopting a diamond-type pixel arrangement that disposes sub-pixels diagonally while maintaining the RGBG Pentile structure, so as to enhance readability.

Thus, by comparison of moiré characteristics depending on RGB Stripe, Pentile, S-Stripe and Diamond pixel structures since the readability may be different according to such pixel structures, the moiré characteristics can be accurately confirmed and the effect obtained from the size of the symmetrical components according to the present invention can be confirmed.

That is, for each back light source of red, green, blue and white, the touch panel fabricated by the method according to the present invention is disposed on the top of an image display device (divided by the liquid crystal types of LCD, OLED and pixel structures), and then is observed for its moiré pattern on angles formed by rotation.

The degree of moiré pattern is evaluated by levels of strong, medium, weak and no occurrence on angles of an inner unit wire.

The moiré pattern is confirmed to occur into the order of green>white>red=blue for back light sources. Therefore, a test for evaluating moiré pattern occurrence is conducted for the green source that causes the strongest moiré pattern occurrence.

Also, the moiré pattern is analyzed according to the angle size of symmetrical components. When calculating the angle size of symmetrical components, it is confirmed that the less moiré pattern occurs from the thinner line width.

Thus, according to the present invention, the angle ($\Theta$, $\Theta=|\Theta_1|=|\Theta_2|$) formed by each of two unit wires and the x-axis or the y-axis may satisfy 18°<$\Theta$<33° or 57°<$\Theta$<72° when the line width of the unit wires is greater than 3 μm, the angle may satisfy 12°<$\Theta$<78° when the line width of the unit wires is greater than 1 μm and not greater than 3 μm, and

TABLE 1

| Metal Line Width | Angle | | | | | | | | | | | | | |
|---|---|---|---|---|---|---|---|---|---|---|---|---|---|---|
| | 0 | 3 | 12 | 18 | 27 | 33 | 42 | 48 | 57 | 63 | 72 | 78 | 87 | 90 |
| 5 | Strong | Strong | Strong | Weak | No | Weak | Weak | Weak | Weak | No | Weak | Strong | Strong | Strong |
| 4 | Strong | Strong | Medium | Weak | No | Weak | Weak | Weak | Weak | No | Weak | Medium | Strong | Strong |
| 3 | Medium | Medium | Weak | No | No | No | No | No | No | No | No | Weak | Medium | Medium |
| 2 | Medium | Medium | Weak | No | No | No | No | No | No | No | No | Weak | Medium | Medium |
| 1 | No | No | No | No | No | No | No | No | No | No | No | No | No | No |

Table 1 shows the degree of a moire pattern occurred according to the line width of unit wires and an angle formed by each of two unit wires and the x-axis or the y-axis.

It is preferred that the moire pattern occurred is observed depending on pixel structures and liquid crystal types.

The pixel structures may be divided into RGB Stripe, Pentile, S-Stripe and Diamond, and the liquid crystal types may be divided into LCD and OLED. Applying such divithe angle may satisfy 0°≤$\Theta$≤90° when the line width of the unit wires is not greater than 1 μm.

The touch sensor panel of the present invention and the fabrication method thereof as mentioned above allow metal wires for forming a metal mesh to be patterned so that they have symmetrical components being in correlation with each other on the basis of x and y axes, thereby improving visibility.

Also, the patterning is carried out so that several symmetrical components are combined to form tetragonal to polygonal patterns freely according to angles, and metal wires have different angles formed by one of them and the x or y axis, based on their line width greater or less than the reference line width value, thereby forming a metal mesh having an optimum angle capable of preventing the occurrence of a moire pattern.

Although the present invention has been described in connection with the preferred embodiments, the embodiments of the present invention are only for illustrative purposes and should not be construed as limiting the scope of the present invention.

It will be understood by those skilled in the art that various changes and modifications can be made thereto within the technical spirit and scope defined by the appended claims.

| [EXPLANATION OF REFERENCE NUMERALS] | |
| --- | --- |
| 20: X-axis | 21: Y-axis |
| 22: First unit wire | 23: Second unit wire |

The invention claimed is:

1. A touch sensor panel having electrode patterns in which continuous unit meshes consisting of conductive unit wires are arranged,
   wherein two conductive unit wires connected to a vertex of the unit mesh form an angle satisfying the following equation with an x-axis or a y-axis:

$|\Theta_1|=|\Theta_2|$ wherein $\Theta_1$ is an angle formed by any one of the two conductive unit wires and the x-axis, and $\Theta_2$ is an angle formed by the other conductive unit wire and the x-axis or the y-axis,
   wherein the electrode patterns comprise a first unit mesh and a second unit mesh, said first unit mesh and said second unit mesh having different sizes from each other; and
   wherein the electrode patterns are formed by a combination of the first unit mesh consisting of first and second symmetrical components having a same size and the second unit mesh consisting of a third symmetrical component and a fourth symmetrical component having different sizes.

2. The touch sensor panel of claim 1, wherein the equation is applied for all vertices constituting the continuous unit meshes.

3. The touch sensor panel of claim 1, wherein the angle $(\Theta, \Theta=|\Theta_1|=|\Theta_2|)$ formed by each of the two conductive unit wires and the x-axis or the y-axis satisfies $18°<\Theta<33°$ or $57°<\Theta<72°$ when a line width of the conductive unit wires is greater than 3 μm.

4. The touch sensor panel of claim 1, wherein the electrode patterns are formed by a combination of (i) the first unit mesh, in which the first and second symmetrical components have a same size and (ii) the second unit mesh, in which first symmetrical components having first and second angles with regard to the x and y axes, respectively, are combined with second symmetrical regions having third and fourth angles with regard to the x and y axes, respectively.

* * * * *